United States Patent [19]

Franaszek et al.

[11] 4,028,535

[45] June 7, 1977

[54] APPARATUS AND METHOD FOR GENERATING A DATA CODE WITH A SPECTRAL NULL

[75] Inventors: Peter Anthony Franaszek, Ossining; David Allen Thompson, Somers, both of N.Y.

[73] Assignee: International Business Machines Corporation, Armonk, N.Y.

[22] Filed: June 11, 1976

[21] Appl. No.: 695,295

[52] U.S. Cl. .................. 235/152; 340/146.1 AB; 340/146.1 F; 360/41

[51] Int. Cl.² .................. G06F 13/04; G06F 7/38; G06F 15/34

[58] Field of Search .......... 340/146.1 AB, 146.1 F; 360/25, 41, 137; 235/152, 156

[56] References Cited

UNITED STATES PATENTS

| 3,777,130 | 12/1973 | Croisier et al. ..................... 235/152 |
| 3,822,404 | 7/1974 | Croisier et al. ................ 235/152 X |

*Primary Examiner*—R. Stephen Dildine, Jr.
*Attorney, Agent, or Firm*—Graham S. Jones, II

[57] ABSTRACT

In a dynamic disc memory system, servo signal tracks and data tracks are adjacent. The servo track includes a signal having a predetermined frequency. With the system and method of this disclosure, the data recorded on the data track is translated to have a frequency null at the frequency of the servo signal track by translating apparatus to eliminate cross-talk at the servo frequency.

7 Claims, 3 Drawing Figures

APPARATUS AND METHOD FOR GENERATING A DATA CODE WITH A SPECTRAL NULL

BACKGROUND OF THE INVENTION

1. Field of the Invention

This invention relates to electrical communications and more particularly to error prevention systems. In the preferred application, this invention relates to dynamic information storage and retrieval and more particularly to error prevention is connection with automatic control of track centering of a magnetic recording head.

2. Description of the Prior Art

In the field of magnetic recording, in the past where there have been separate magnetic recording heads for data and track sensing for positioning of a magnetic recording head, it has been necessary to provide protection against magnetic and electrical cross-talk between channels. In order to prevent such cross-talk, wires have been shielded and heads have been separated by magnetic shielding material. In fact, in many cases the head used to control tracking of the servo mechanism is placed far away from the head which operates to read and/or record data, a situation which introduces positioning errors due to intermittent mechanical factors such as thermal expansion and contraction or vibration of the two heads. In some cases, the track following head must be located adjacent a separate disk, which increases the probability of error even more.

Previous work of P. A. Franaszek, who is a coinventor herein, is described in U.S. Pat. No. 3,840,854. The patent teaches a technique for modifying the D.C. component of a binary code by introduction of ones into strings of zeroes and introduction of zeroes into strings of ones so that there is substantial elimination of the D.C. component of a signal.

A publication of Furtney et al entitled "DC Balanced Encoded Recording," IBM Technical Disclosure Bulletin, Vol. 18, No. 1, June 1975, pp 53-54 shows a code selection circuit which is used to provide a D.C. balance of a recording signal similar to that in U.S. Pat. No. 3,840,854.

J. H. Bleher wrote a publication entitled "Data Code Servo," IBM Technical Disclosure Bulletin, Vol. 18, No. 6, Nov. 1975, p. 1917 which shows adjacent track heads on each side of a data recording head, with alternating codes upon adjacent tracks so that with the two servo heads straddling adjacent tracks, the low pass result of the signals received is used to control a servo.

In a publication by L. F. Shew entitled "Track Servo System," IBM Technical Disclosure Bulletin, Vol. 16, No. 7, Dec. 1973, pp 2,225-6 there is described the need to place the servo track immediately next to the data track in order to overcome errors caused by differences in temperature which lead to large positioning errors. The publication proposes that the data on the track or an adjacent track plus very small sample servo sectors should be used to control head position. This takes a substantial fraction of the data track and it requires a rather sophisticated servo control system responding to intermittent signals which can be overcome by sharing a single servo track with a number of other tracks.

Accordingly, it is desirable to reduce the chance of cross-talk between the servo track and the data track, respective heads and/or respective leads.

Another object of this invention is to provide means for generating data signals having a spectral null at the frequency of the servo signal track.

SUMMARY OF THE INVENTION

A digital device transmitting a stream of binary information often causes electromagnetic interference (noise) in adjacent sensitive channels. For example, the process of writing a magnetic recording medium often interferes with the servo channel. This interference can be minimized if the servo channel can be made to operate in a narrow frequency band centered around twice the data clock frequency, since the data signal has no energy at that frequency. Unfortunately, all the natural spectral nulls occur at even harmonics of the data clock frequency, and there are often dominant engineering reasons for making the data clock frequency the highest in the system. This invention deals with means for restricting the data code so that a spectral energy null occurs at a frequency less than the data clock frequency.

The solution to the problem of cross-talk in accordance with this invention involves providing a data code for the system which has a frequency null at the servo frequency selected for the servo code. Referring to FIG. 3 showing data code amplitude vs. frequency, if the data clock frequency is $F_{max}$ and the servo frequency is $F_{max}/N$ (where N is an integer), with a data code null (dotted lines) at that frequency, then there will be no harmful cross-talk between the servo and the data lines of a head.

DEFINITIONS:

Let a word be defined as a string of N binary bits. For example, 01011 is a word with N=5. Let the parity P of a word be defined as the sum, modulo 2, of the bits in the word taken separately. For example, 01011 has parity 1. Let NRZI be the method of encoding commonly used in magnetic recording, such that each bit in the data stream controls the presence (1) or absence (0) of a polarity reversal of write current at the beginning of the corresponding data clock cycle. Let the run length K be the maximum number of successive zeroes which may appear in the data stream. Let the Fourier component $s_r$ be a number proportional to integral $\int I(t) \sine(\omega_r t + \phi) \, dt$ where $I(t)$ is a current which is zero except during a single word, during which it represents the NRZI encoding of the word with the first transition being positive. Let r be the ratio of the frequency of the all ones waveform to $f_r = \omega_r/2\pi$. For example, $f_2$ is at one-half the all ones frequency and one-fourth of the clock frequency. Let the Fourier component $c_r$ be a number proportional to the integral $\int I(t) \cosine(\omega_r t + \phi) \, dt$. Let S be the running sum of the $\{s_r\}$ and C be the running sum of the $\{c_r\}$.

In the above-mentioned Franaszek patent, a method is disclosed for forcing a binary waveform to have zero DC component by keeping the running sum of the contributions of each clock cycle and then choosing the next data word from a list, any member of which will cause the sum not to grow larger in the same polarity. The methods employed here are based on the bounding of the running sums of the Fourier components at the frequency to be suppressed. For example, there is a code word length N = 10 and run length 6 such that 256 choices (8 bits) exist for any polarities of $s_2$ and $c_2$ which are desired. Thus, this code has an efficiency of 80%.

The method employed in preparing a lookup table in accordance with this invention is as follows: A list of all possible words of length N which meet the primary criteria (such as run length) is drawn up. Each word is examined, and a triple ($s_r$, $c_r$, $p$) is computed, as defined above. Then the list is divided into four sublists labelled ++; +—; —+; and ——. A word is placed in the ++ sublist, for example, if it has a non-negative value of $s_r$ and of $c_r$. Words having zero value for $s_r$ or $c_r$ appear in several sublists. The shortest sublist determines the maximum number of data words which may be encoded without ambiguity such that the sums $s_r$ and $c_r$ remain bounded. When a word is to be encoded, the current waveform polarity (which is the same as the running sum of p modulo 2) and the running sums $s_r$ and $c_r$ are examined. When the polarity is positive, the sublist corresponding to the (sign of $s_r$), (sign of $c_r$) is used for encoding, if negative the sublist with both signs negated is used. If the code word is the number M, the Mth entry is used. This is a read-only-store (ROS) with a lookup table-type of encoding. A similar table is used for decoding. In general, the number M will require less than N bits for binary representation, so the efficiency of this encoding is less than one. However, the energy in the waveform at frequency $f_r$ is zero, and the energy indicated by a detector of finite bandwidth and sampling time is also bounded.

In addition to this general case, there are several special cases of interest: a) Only codde words with $s_r = 0$, $c_r = 0$ are used. Then no running sums need be kept. However, the efficiency is lower, usually about 50%. b) An external clock is available to control a synchronous detector. Then only one of the Fourier components need be bounded (the one in phase with the servo signal), and the number of sublists is reduced to two. c) Only code words with zero c are used. Again the number of sublists is two.

In all the above, the choice of phase angle $\phi$ was arbitrary, so an optimum, constant value is assumed to be chosen. Also, it is not possible, in general, to find a scale factor which will make the $C_i$ terms integers. Some will involve irrational numbers. However, it is possible to make a rational approximation to each such number which is accurate to within any previously specified tolerance.

Mathematical Basis for the Invention

The energy in a waveform at any frequency can be determined by the Fourier transform of the waveform (see, for example, Skilling, "Electrical Engineering Circuits," John Wiley and Sons, New York 1957):

$$g(\omega) = \frac{1}{2\pi} \int_0^\infty f(t)\, e^{j\omega t + \psi} dt$$

where $g(\omega)$ = the amplitude of the spectral component at frequency $\omega$
$e^{j\omega t} = \cos \omega t + j \sin \omega t$, the two Fourier components
$j = \sqrt{-1}$
$f(t)$ = the waveform as a function of time, which begins at $t = 0$, i.e., $f = 0$ for $t < 0$
$\omega$ = the frequency ($2\pi f$) of interest
$\phi$ = an arbitrary phase angle chosen for convenience The waveform of interest to this invention is a binary synchronous one, such as is used for the write current in digital recording systems and for the transmission voltage in digital communications circuits. Such a waveform has a constant value during any given clock period $\tau$. It may switch between two permissible values at the end of a clock period. Thus the previous integral may be replaced by a summation:

$$g(\omega) = \frac{1}{2\pi j \omega} \sum_{n=1}^{\infty} \alpha_n \int_{n\tau}^{(n+1)\tau} e^{j\omega t + \psi} dt$$

when $\alpha_n$ is the value of the waveform, either +1 or −1, during the nth clock period. This integral can be solved:

$$g(\omega) = K \sum_{n=1}^{\infty} \alpha_n e^{j n \omega \tau + \psi} = K \sum_{n=1}^{\infty} \alpha_n (\cos(n\omega\tau + \psi) + j \sin(n\omega\tau + \psi))$$

where K is a constant and $\psi$ is an arbitrary phase angle.

The problem is that the $\alpha_n$ are outside of the system's control, and are determined by the data pattern. With unfavorable circumstances, $\alpha$ will be positive when $\cos(n\omega\tau + \psi)$ is positive and negative when it is negative. Even if the $\alpha_n$ are random, the sum is subject to arbitrarily large fluctuations. The only way to control and eliminate this frequency is to place a firm bound on the partial sum as it accumulates. Actually, there are two independent sums to control, one involving the cosine terms and one involving the sine terms. The total power is the sum of the power represented by the cosine terms (real part) and the sine terms (imaginary part).

This invention employs four possible encodings for each word, depending on the current value of the sine and cosine partial sums. When the frequency to be nulled is an integral sub-multiple of the clock frequency, then the sine and cosine terms can take on only a limited number of values. For example, when $\tau$, the clock period, is one-fourth of the period of the frequency to be nulled, then there are only four possible values for $\cos(n\omega\tau + \psi)$. If $\psi$ is chosen to be zero, then the values are 1, 0, −1, and 0. If $\psi$ is chosen to be 45°, then the values (normalized by a constant multiplier) are 1, −1, −1, and 1. Other values of $\psi$ could be used, but those are the most often useful. Having $\tau$ equal to one-fourth of the clock period is, in fact, the case for the frequency $f_2$ described below as the preferred embodiment. $\psi = 0$ is the optimal choice when N/2 is even and $\psi = 45°$ is optimal for N/2 odd.

For larger sub-multiples, such as $\tau$ equal to one-eighth of a clock period, some of the values for $\cos(n\omega\tau + \psi)$ must be irrational. However, these irrational values can be approximated by rational numbers to an arbitrary degree. The approximate values 7, 5, 0, −5, −7, −5, 0, 5 are accurate to better than 1%. The approximate values 17, 12, 0, −12, −17, −12, 0, 12 are accurate to nearly one part in a thousand. The price of approximation is slightly larger storage registers for the partial sums, but this remains a very small part of the cost of implementing this invention.

In accordance with this invention, a code translating system and method are provided. Coded data is translated to provide a spectral null at a predetermined frequency. An addressable translating apparatus provides a coded outut signal in response to a coded input signal. A monitoring apparatus monitors the output of the translating apparatus with respect to predetermined limit conditions for providing code selection data as a function of said output signals. The monitoring apparatus has an output connected to send the code selection data to modify the input signal to the translating means

DETAILED DESCRIPTION OF THE PREFERRED EMBODIMENT

Figure 1:
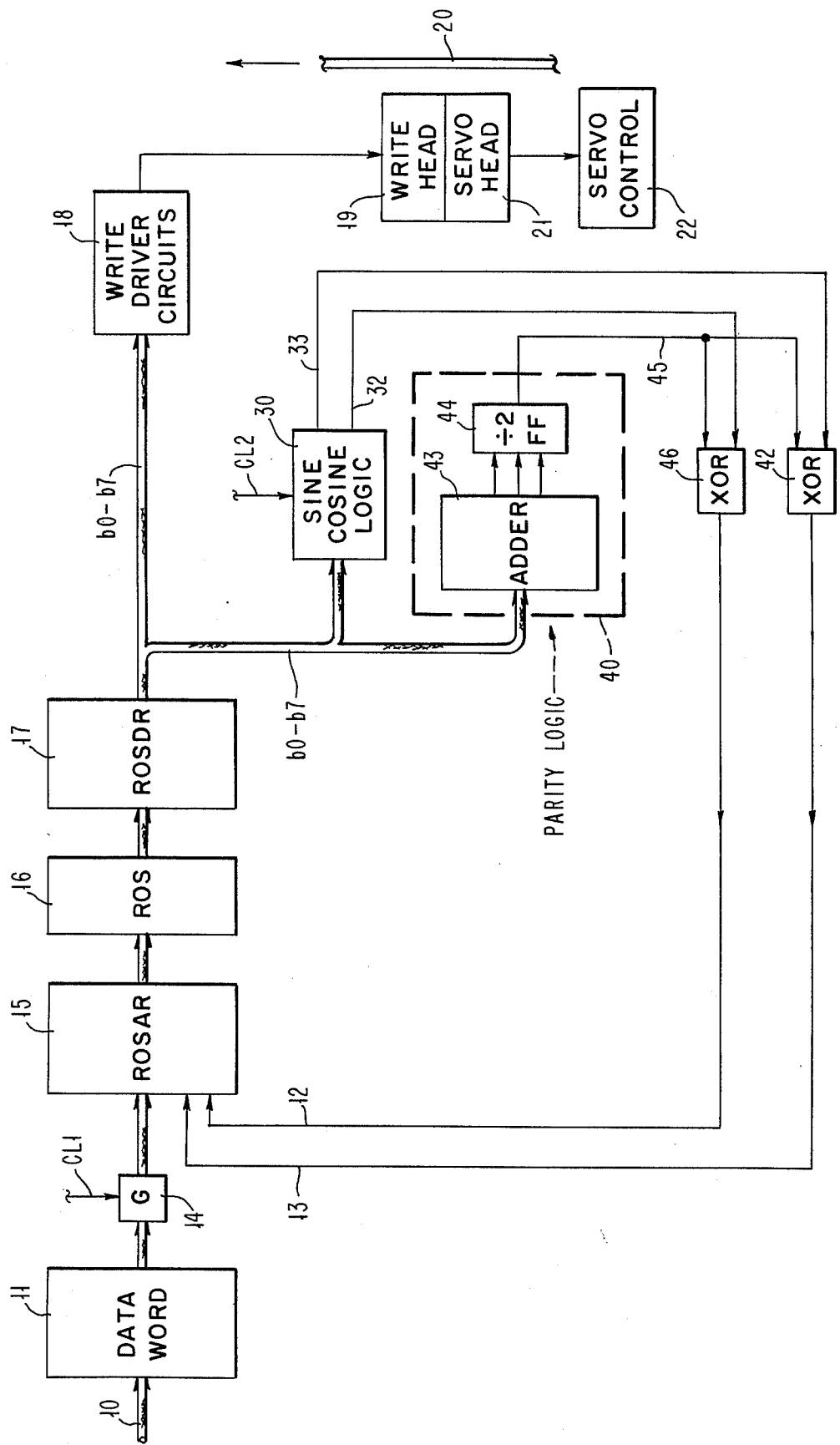
FIG. 1 shows a block diagram of a code converting system for generating data codes with a spectral null at the servo track frequency of a magnetic recording system.
Figure 2:
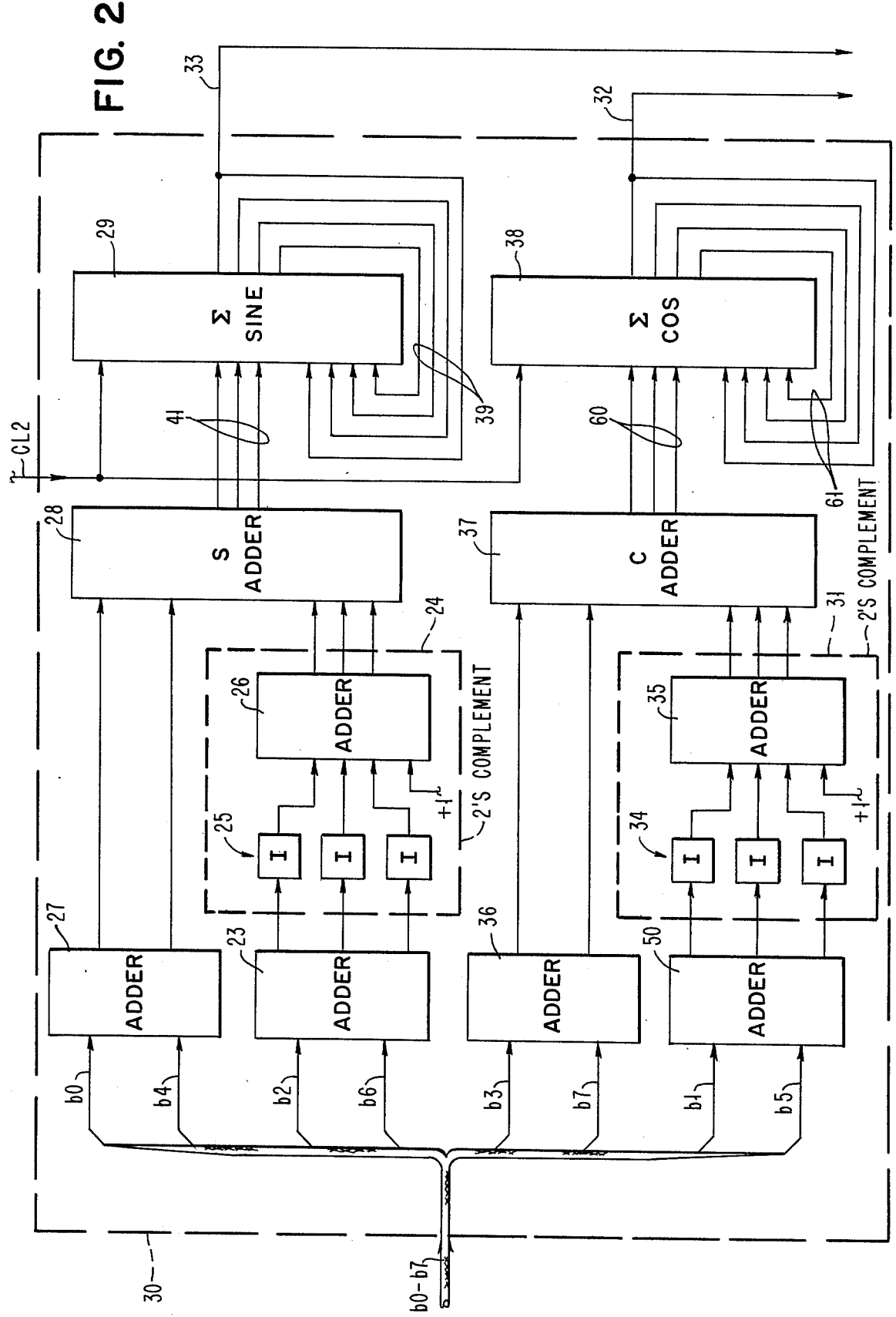
FIG. 2 shows the sine-cosine (cos) logic system of FIG. 1 in greater detail.
Figure 3:
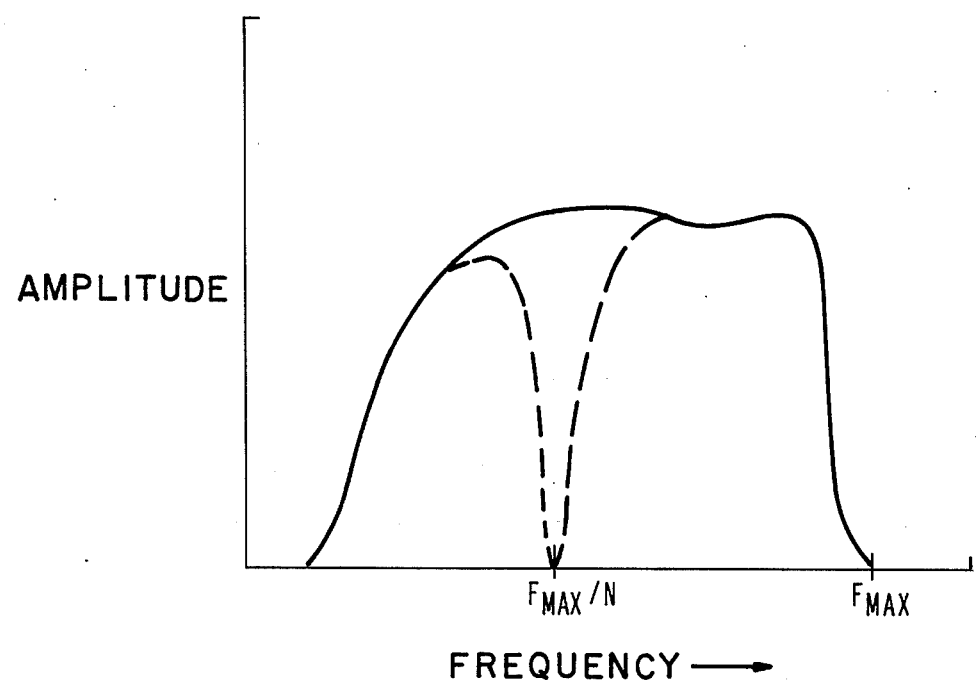
FIG. 3 shows the spectral amplitude of a data code as a function of frequency, with a spectral null shown at an integral fraction of the maximum frequency of the code.

FIG. 1 shows the electrical schematic diagram of a particular way of converting a standard binary 6-bit code into a code having a null at one-half the all ones frequency ($F_{max}/2$ in FIG. 3). The standard binary code is supplied on cable 10 to register 11. Register 11 holds the signals on line 10 until gate 14 is operated to supply an address signal to the Read Only Store (ROS) Address Register (AR) 15 for ROS 16. The ROS 16 supplies a decoded output at the ROS Data Register (DR) 17, which is employed to provide the desired output signal to be supplied via conventional write-drive electronics 18 to magnetic recording write head 19 on lines $b0$–$b7$. The system must monitor the signals upon lines $b0$–$b7$ to assure that there is a null in the data on lines $b0$–$b7$ at the particular frequency $Fmax/N$ for which the system is designed. It should be noted that the data on lines $b0$–$b7$ is recorded in serial fashion upon a magnetic recording medium 20 by head 19. The intent is that the serial data from head 19 will have a null at the frequency $F_{max}/N$ being read from medium 20 by servo head 21 connected to the servo control unit 22 of the magnetic recording system. Sine cos logic 30 in FIG. 2 monitors data on lines $b0$–$b7$. The data monitored on lines $b2$ and $b6$ is added in adder 23 which drives 2's complement unit 24 containing inverters 25 which produce the complement of the output of adder 23 and adder 26 which increases that value by +1. The output of adder 26 is passed to S adder 28 to be combined with the output of adder 27 which adds bits $b0$ and $b4$. The result represented by the outut from S adder 28 is stated by the equation $S = (b0+b4) - (b2+b6)$. This output passes to the $\Sigma$ sine adder which accumulates the sine value by adding to its previous sum on lines 41, the value on lines 41 from S adder 28. The most significant bit representing the polarity of the sine sum is passed via line 33 in FIG. 2 to XOR logic, where it is a logical input along with the output of parity logic 40. Logic 40 contains adder 43 which adds all of the bits on lines $b0$–$b7$ together and divides by 2 in flip flop 44 to produce a parity output on line 45 to XOR 42 and XOR 45.

Adder 36 adds the values on lines $b3$ and $b7$, while adder 50 adds the values on lines $b1$ and $b5$ which are to be subtracted from the previous sum when presented to C adder 37 via 2's complement logic 31. Logic 31 contains inverters 34 and adder 35 and it operates analogously to adder 24. C adder 37 obtains the result of the formula $(b3+b7) - (b1+b5)$. The output of adder 37 passes via cables 60 to the $\Sigma$ cos adder 38 which is analogous to adder 29. The output of adder 38 on line 32 represents the polarity of the sum from adder 38 which passes to XOR 46. Output cables 61 from adder 38 are analogous to cables 39.

The output of XOR 42 passes on line 13 to the highest order address input line to ROSAR 15. The output of XOR 46 passes on line 12 to the second highest order address input line to ROSAR 15. When line 13 is positive, the ROS address is at least 128 and when line 12 is positive, the address is at least 64. This can be seen by reference to Table I which shows the addresses supplied to ROSAR 15 as well as the corresponding output values to ROSDR in binary numbers next to them. Table II shows the same information as Table I translated from decimal-binary to decimal-decimal form for the convenience of the reader. Note that the headings indicate the parity, sine and cos values for each vertical row of Table I. Note that the values for 0, 64, 128, and 192 across the whole of Table I down to 15, 79, 143, and 207 are identical as one crosses the page. The same applies to values from 56, 120, 184, 248 down to the end 63, 127, 191, and 255. In those cases, changes in the outputs of XOR's 42 and 46 will not change the output from ROSDR 17. This situation exists because the code words for those positions in the table are among those having zero contribution to the sine and cosine running sums. Code words which change both the sine and cosine sums can appear in only one column of the encoding table.

The ROS 16 can include hardware for converting any NRZI code to provide the desired null frequency. Table I is appropriate to a ROS for $f_2$ N=8, K=4, which provides a magnetic recording waveform which for the usual NRZI encoding has zero energy at one-half the all 1's frequency which may also be stated as zero energy at one-fourth of the data clock frequency. The number of bits in a word to be recorded from ROS 17 is 8 bits. Thus, there are 256 possible combinations of bits which could be recorded on the magnetic medium in each word. However, many of these combinations are forbidden as they have an excessive number of successive zeroes for the clock circuits to handle during readback. A constraint employed is to limit the maximum number of successive zeroes to four. As a result of the previously stated restrictions, only the equivalent of 6 information bits ($2^6 = 64$ combinations) which can be encoded in the 8 bit positions which are stored on the recording medium 20 (disk, tape, etc.). When recording, the input data on cable 10 is received six bits in parallel at a time and encoded by ROS 16 into eight-bit storage words. When the words are later read back from medium 20, they are read back eight bits at a time to generate groups of 6 data bits, as shown by Table III.

Table I shows how this is done. The left-hand column for "data in" from 0–63 represents binary 00000000 as 0, binary 00000001 as and 00011011 is 27, etc. Note that eight bits are involved, only the least six significant bits of which are from gate 14, the two most significant bits being from lines 12 and 13. Encoding is accomplished by the table lookup function of ROS 16. There are four possible encoded outputs for each input on cable 10, register 11 and gate 14 which are selected by the binary values upon lines 12 and 13. The values for the sine and cos energy terms and the parity term are shown above the columns in Table I. For the upper set of values parity is (−) or zero and for the lower set of values parity is (+) or one. The polarities of the sine and cos are truly polarities. For example, for an input word on cable 10 of 000011011 (27 decimal) and with parity zero (−) and the sine sum negative, and cos sum positive, the value (27) is found in column 2 next to decimal 91 yielding at ROSDR 17 the binary number 10100011 (decimal 163).

The above subject matter can be expressed in another way. Let Bs be the leading (sine) bit and Bc be the second bit. Let Ps represent the polarity of the running sine sum (zero for − and one for +), Pc the polarity of the cos sum, and let P be the parity at the end of the previously encoded word. Then Bs = Ps ⊕ P and Bc = Pc ⊕ P. In the above example, 011011 (27) from cable 10 becomes 01011011 (91) from Tables I and II, the output for an input of 91 is 10100011 (163). Table II is identical to Table I, except that both the input and output binary words are represented as ordinary decimal numbers.

Decoding is accomplished using the code in Table III. The readback circuits, not shown, receive a bit pattern such as 10100011 (163) which the table lookup in a ROS indicates should be decoded as 011011 (27).

During the encoding process by clock time CL2, the sine, cos, and parity registers are updated for the next word. The values to be added can be obtained in additional elements of the ROS lookup table or computed directly, as shown in FIG. 2, depending on the relative cost of readonly memory versus high-speed logic. The amount of memory required for the encoding lookup table in ROS can be reduced somewhat by observing that certain input words have don't-care conditions with regard to Bs and Bc. For example, input words 0 through 15 and 57 through 63 are independent of Bs and Bc. Words 16 through 31 depend only on Bs, and words 32 through 47 depend only on Bc. In such a small table it would probably not be worthwhile observing these shortcuts for address decoding, but in the longer codes of Table IV, the savings could be significant. In the decoding process, it should be observed that about half of the possible recorded words are not used, a fact which is useful for error detection.

The embodiment given in FIGS. 1 and 2 is a self-contained circuit that could be inserted into an existing magnetic recording write channel. The previously existing write driver circuits shown in FIG. 1 perform an encoding function which could be incorporated into the lookup table ROS, with minor circuit changes which would be obvious to a skilled practitioner of the art, without significantly altering the invention. For the example given, NRZI magnetic encoding, the encoding function is particularly simple, being performed by a single flip-flop which processes the data stream serially, and which changes output level during a clock period for each one. Thus, the encoding produced by the ROS could be already in the NRZI form, resulting in minor changes to the sine and cosine circuitry: a complementary ROS output would be used, depending on the previous parity, and the last bit of the encoded word is the new parity, so the parity logic of FIG. 1 would be omitted. Such a minor circuit rearrangement can be obtained in a straightforward way be merging the encoder circuit of this invention with a small part of the conventional circuitry of the magnetic recording system.

Table IV shows the coding efficiency which can be obtained with this technique for $f_2$. The code of Table I is represented by N=8. As a rule of thumb, the encoded word is about 2 bits longer than the input data word, and the minimum run length K increases as the word length N and the coding efficiency increase. It is also possible to null more than two spectral components; for example, the DC component can also be eliminated at the cost of approximately another bit. This would involve another storage register, and the lookup table would have eight lists instead of four.

TABLE I

| SINE− COS− PAR− | | SINE− COS+ PAR− | | SINE+ COS− PAR− | | SINE+ COS+ PAR− | |
| OR | | OR | | OR | | OR | |
| SINE+ COS+ PAR+ | | SINE+ COS− PAR+ | | SINE− COS+ PAR+ | | SINE− COS− PAR+ | |
| --- | --- | --- | --- | --- | --- | --- | --- |
| 0 | 00100010 | 64 | 00100010 | 128 | 00100010 | 192 | 00100010 |
| 1 | 00111011 | 65 | 00111011 | 129 | 00111011 | 193 | 00111011 |
| 2 | 00111100 | 66 | 00111100 | 130 | 00111100 | 194 | 00111100 |
| 3 | 01000011 | 67 | 01000011 | 131 | 01000011 | 195 | 01000011 |
| 4 | 01000100 | 68 | 01000100 | 132 | 01000100 | 196 | 01000100 |
| 5 | 01011101 | 69 | 01011101 | 133 | 01011101 | 197 | 01011101 |
| 6 | 01100001 | 70 | 01100001 | 134 | 01100001 | 198 | 01100001 |
| 7 | 01101110 | 71 | 01101110 | 135 | 01101110 | 199 | 01101110 |
| 8 | 01110111 | 72 | 01110111 | 136 | 01110111 | 200 | 01110111 |
| 9 | 01111111 | 73 | 01111111 | 137 | 01111111 | 201 | 01111111 |
| 10 | 10000111 | 74 | 10000111 | 138 | 10000111 | 201 | 10000111 |
| 11 | 10001111 | 75 | 10001111 | 139 | 10001111 | 203 | 10001111 |
| 12 | 10010001 | 76 | 10010001 | 140 | 10010001 | 204 | 10010001 |
| 13 | 10011110 | 77 | 10011110 | 141 | 10011110 | 205 | 10011110 |
| 14 | 10100010 | 78 | 10100010 | 142 | 10100010 | 206 | 10100010 |
| 15 | 10111011 | 79 | 10111011 | 143 | 10111011 | 207 | 10111011 |
| 16 | 00111010 | 80 | 00111010 | 144 | 00100011 | 208 | 00100011 |
| 17 | 01000010 | 81 | 01000010 | 145 | 00100100 | 209 | 00100100 |
| 18 | 01011011 | 82 | 01011011 | 146 | 00111101 | 210 | 00111101 |
| 19 | 01011100 | 83 | 01011100 | 147 | 01000101 | 211 | 01000101 |
| 20 | 01100111 | 84 | 01100111 | 148 | 01110110 | 212 | 01110110 |
| 21 | 01101111 | 85 | 01101111 | 149 | 01111001 | 213 | 01111001 |
| 22 | 01110001 | 86 | 01110001 | 150 | 10000110 | 214 | 10000110 |
| 23 | 01111110 | 87 | 01111110 | 151 | 10001001 | 215 | 10001001 |
| 24 | 10001110 | 88 | 10001110 | 152 | 10111010 | 216 | 10111010 |
| 25 | 10010111 | 89 | 10010111 | 153 | 11000010 | 217 | 11000010 |
| 26 | 10011111 | 90 | 10011111 | 154 | 11011011 | 218 | 11011011 |
| 27 | 10100011 | 91 | 10100011 | 155 | 11011100 | 219 | 11011100 |
| 28 | 10100100 | 92 | 10100100 | 156 | 11100111 | 220 | 11100111 |
| 29 | 10111101 | 93 | 10111101 | 157 | 11101111 | 221 | 11101111 |
| 30 | 11000101 | 94 | 11000101 | 158 | 11110001 | 222 | 11110001 |

TABLE I — Continued

| | SINE− COS− PAR−<br>OR<br>SINE+ COS+ PAR+ | | SINE− COS+ PAR−<br>OR<br>SINE+ COS− PAR+ | | SINE+ COS− PAR−<br>OR<br>SINE− COS+ PAR+ | | SINE+ COS+ PAR−<br>OR<br>SINE− COS− PAR+ |
|---|---|---|---|---|---|---|---|
| 31 | 11110110 | 95 | 11110110 | 159 | 11111110 | 223 | 11111110 |
| 32 | 01101101 | 96 | 00100001 | 160 | 01101101 | 224 | 00100001 |
| 33 | 01110011 | 97 | 00101110 | 161 | 01110011 | 225 | 00101110 |
| 34 | 01110100 | 98 | 00110111 | 162 | 01110100 | 226 | 00110111 |
| 35 | 10000100 | 99 | 00111111 | 163 | 10000100 | 227 | 00111111 |
| 36 | 10011101 | 100 | 01000111 | 164 | 10011101 | 228 | 01000111 |
| 37 | 10100001 | 101 | 01001111 | 165 | 10100001 | 229 | 01001111 |
| 38 | 10101110 | 102 | 01010001 | 166 | 10101110 | 230 | 01010001 |
| 39 | 10110111 | 103 | 01011110 | 167 | 10110111 | 231 | 01011110 |
| 40 | 10111111 | 104 | 01100010 | 168 | 10111111 | 232 | 01100010 |
| 41 | 11000111 | 105 | 01111011 | 169 | 11000111 | 233 | 01111011 |
| 42 | 11001111 | 106 | 01111100 | 170 | 11001111 | 234 | 01111100 |
| 43 | 11010001 | 107 | 10001011 | 171 | 11010001 | 235 | 10001011 |
| 44 | 11011110 | 108 | 10001100 | 172 | 11011110 | 236 | 10001100 |
| 45 | 11100010 | 109 | 10010010 | 173 | 11100010 | 237 | 10010010 |
| 46 | 11111011 | 110 | 11101101 | 174 | 11111011 | 238 | 11101101 |
| 47 | 11111100 | 111 | 11110011 | 175 | 11111100 | 239 | 11110011 |
| 48 | 01101011 | 112 | 01001110 | 176 | 01110101 | 240 | 00101111 |
| 49 | 01110010 | 113 | 01010111 | 177 | 10110110 | 241 | 00111110 |
| 50 | 10011011 | 114 | 01011111 | 178 | 10111001 | 242 | 01001001 |
| 51 | 10011100 | 115 | 01100011 | 179 | 11001110 | 243 | 01111010 |
| 52 | 10100111 | 116 | 01111101 | 180 | 11010111 | 244 | 10001010 |
| 53 | 10101111 | 117 | 10010011 | 181 | 11011111 | 245 | 11101011 |
| 54 | 10111110 | 118 | 10010100 | 182 | 11100100 | 246 | 11101100 |
| 55 | 11111010 | 119 | 11110101 | 183 | 11111101 | 247 | 11110010 |
| 56 | 10111100 | 120 | 10111100 | 184 | 10111100 | 248 | 10111100 |
| 57 | 11000011 | 121 | 11000011 | 185 | 11000011 | 249 | 11000011 |
| 58 | 11000100 | 122 | 11000100 | 186 | 11000100 | 250 | 11000100 |
| 59 | 11011101 | 123 | 11011101 | 187 | 11011101 | 251 | 11011101 |
| 60 | 11100001 | 124 | 11100001 | 188 | 11100001 | 252 | 11100001 |
| 61 | 11101110 | 125 | 11101110 | 189 | 11101110 | 253 | 11101110 |
| 62 | 11110111 | 126 | 11110111 | 190 | 11110111 | 254 | 11110111 |
| 63 | 11111111 | 127 | 11111111 | 191 | 11111111 | 255 | 11111111 |

TABLE II

| IN | OUT | IN | OUT | IN | OUT | IN | OUT |
|---|---|---|---|---|---|---|---|
| 0 | 34 | 64 | 34 | 128 | 34 | 192 | 34 |
| 1 | 59 | 65 | 59 | 129 | 59 | 193 | 59 |
| 2 | 60 | 66 | 60 | 130 | 60 | 194 | 60 |
| 3 | 67 | 67 | 67 | 131 | 67 | 195 | 67 |
| 4 | 68 | 68 | 68 | 132 | 68 | 196 | 68 |
| 5 | 93 | 69 | 93 | 133 | 93 | 197 | 93 |
| 6 | 97 | 70 | 97 | 134 | 97 | 198 | 97 |
| 7 | 110 | 71 | 110 | 135 | 110 | 199 | 110 |
| 8 | 119 | 72 | 119 | 136 | 119 | 200 | 119 |
| 9 | 127 | 73 | 127 | 137 | 127 | 201 | 127 |
| 10 | 135 | 74 | 135 | 138 | 135 | 202 | 135 |
| 11 | 143 | 75 | 143 | 139 | 143 | 203 | 143 |
| 12 | 145 | 76 | 145 | 140 | 145 | 204 | 145 |
| 13 | 158 | 77 | 158 | 141 | 158 | 205 | 158 |
| 14 | 162 | 78 | 162 | 142 | 162 | 206 | 162 |
| 15 | 187 | 79 | 187 | 143 | 187 | 207 | 187 |
| 16 | 58 | 80 | 58 | 144 | 35 | 208 | 35 |
| 17 | 66 | 81 | 66 | 145 | 36 | 209 | 36 |
| 18 | 91 | 82 | 91 | 146 | 61 | 210 | 61 |
| 19 | 92 | 83 | 92 | 147 | 69 | 211 | 69 |
| 20 | 103 | 84 | 103 | 148 | 118 | 212 | 118 |
| 21 | 111 | 85 | 111 | 149 | 121 | 213 | 121 |
| 22 | 113 | 86 | 113 | 150 | 134 | 214 | 134 |
| 23 | 126 | 87 | 126 | 151 | 137 | 215 | 137 |
| 24 | 142 | 88 | 142 | 152 | 186 | 216 | 186 |
| 25 | 151 | 89 | 151 | 153 | 194 | 217 | 194 |
| 26 | 159 | 90 | 159 | 154 | 219 | 218 | 219 |
| 27 | 163 | 91 | 163 | 155 | 220 | 219 | 220 |
| 28 | 164 | 92 | 164 | 156 | 231 | 220 | 231 |
| 29 | 189 | 93 | 189 | 157 | 239 | 221 | 239 |

TABLE II—Continued

| IN | OUT | IN | OUT | IN | OUT | IN | OUT |
|----|-----|----|-----|----|-----|----|-----|
| 30 | 197 | 94 | 197 | 158 | 241 | 222 | 241 |
| 31 | 246 | 95 | 246 | 159 | 254 | 223 | 254 |
| 32 | 109 | 96 | 33 | 160 | 109 | 224 | 33 |
| 33 | 115 | 97 | 46 | 161 | 115 | 225 | 46 |
| 34 | 116 | 98 | 55 | 162 | 116 | 226 | 55 |
| 35 | 132 | 99 | 63 | 163 | 132 | 227 | 63 |
| 36 | 157 | 100 | 71 | 164 | 157 | 228 | 71 |
| 37 | 161 | 101 | 79 | 165 | 161 | 229 | 79 |
| 38 | 174 | 102 | 81 | 166 | 174 | 230 | 81 |
| 39 | 183 | 103 | 94 | 167 | 183 | 231 | 94 |
| 40 | 191 | 104 | 98 | 168 | 191 | 232 | 98 |
| 41 | 199 | 105 | 123 | 169 | 199 | 233 | 123 |
| 42 | 207 | 106 | 124 | 170 | 207 | 234 | 124 |
| 43 | 209 | 107 | 139 | 171 | 209 | 235 | 139 |
| 44 | 222 | 108 | 140 | 172 | 222 | 236 | 140 |
| 45 | 226 | 109 | 146 | 173 | 226 | 237 | 146 |
| 46 | 251 | 110 | 237 | 174 | 251 | 238 | 237 |
| 47 | 252 | 111 | 243 | 175 | 252 | 239 | 243 |
| 48 | 107 | 112 | 78 | 176 | 117 | 240 | 47 |
| 49 | 114 | 113 | 87 | 177 | 182 | 241 | 62 |
| 50 | 155 | 114 | 95 | 178 | 185 | 242 | 73 |
| 51 | 156 | 115 | 99 | 179 | 206 | 243 | 122 |
| 52 | 167 | 116 | 125 | 180 | 215 | 244 | 138 |
| 53 | 175 | 117 | 147 | 181 | 223 | 245 | 235 |
| 54 | 190 | 118 | 148 | 182 | 228 | 246 | 236 |
| 55 | 250 | 119 | 245 | 183 | 253 | 247 | 242 |
| 56 | 188 | 120 | 188 | 184 | 188 | 248 | 188 |
| 57 | 195 | 121 | 195 | 185 | 195 | 249 | 195 |
| 58 | 196 | 122 | 196 | 186 | 196 | 250 | 196 |
| 59 | 221 | 123 | 221 | 187 | 221 | 251 | 221 |
| 60 | 225 | 124 | 225 | 188 | 225 | 252 | 225 |
| 61 | 238 | 125 | 238 | 189 | 238 | 253 | 238 |
| 62 | 247 | 126 | 247 | 190 | 247 | 254 | 247 |
| 63 | 255 | 127 | 255 | 191 | 255 | 255 | 255 |

TABLE III

| TAPE | OUT | TAPE | OUT |
|------|-----|------|-----|
| 33 | 32 | 146 | 45 |
| 34 | 0 | 147 | 53 |
| 35 | 16 | 148 | 54 |
| 36 | 17 | 151 | 25 |
| 46 | 33 | 155 | 50 |
| 47 | 48 | 156 | 51 |
| 55 | 34 | 157 | 36 |
| 58 | 16 | 158 | 13 |
| 59 | 1 | 159 | 26 |
| 60 | 2 | 161 | 37 |
| 61 | 18 | 162 | 14 |
| 62 | 49 | 163 | 27 |
| 63 | 35 | 164 | 28 |
| 66 | 17 | 167 | 52 |
| 67 | 3 | 174 | 38 |
| 68 | 4 | 175 | 53 |
| 69 | 19 | 182 | 49 |
| 71 | 36 | 183 | 39 |
| 73 | 50 | 185 | 50 |
| 78 | 48 | 186 | 24 |
| 79 | 37 | 187 | 15 |
| 81 | 38 | 188 | 56 |
| 87 | 49 | 189 | 29 |
| 91 | 18 | 190 | 54 |
| 92 | 19 | 191 | 40 |
| 93 | 5 | 194 | 25 |
| 94 | 39 | 195 | 57 |
| 95 | 50 | 196 | 58 |
| 97 | 6 | 197 | 30 |
| 98 | 40 | 199 | 41 |
| 99 | 51 | 206 | 51 |
| 103 | 20 | 207 | 42 |

TABLE III—Continued

| TAPE | OUT | TAPE | OUT |
|---|---|---|---|
| 107 | 48 | 209 | 43 |
| 109 | 32 | 215 | 52 |
| 110 | 7 | 219 | 26 |
| 111 | 21 | 220 | 27 |
| 113 | 22 | 221 | 59 |
| 114 | 49 | 222 | 44 |
| 115 | 33 | 223 | 53 |
| 116 | 34 | 225 | 60 |
| 117 | 48 | 226 | 45 |
| 118 | 20 | 228 | 54 |
| 119 | 8 | 231 | 28 |
| 121 | 21 | 235 | 53 |
| 122 | 51 | 236 | 54 |
| 123 | 41 | 237 | 46 |
| 124 | 42 | 238 | 61 |
| 125 | 52 | 239 | 29 |
| 126 | 23 | 241 | 30 |
| 127 | 9 | 242 | 55 |
| 132 | 35 | 243 | 47 |
| 134 | 22 | 245 | 55 |
| 135 | 10 | 246 | 31 |
| 137 | 23 | 247 | 62 |
| 138 | 52 | 250 | 55 |
| 139 | 43 | 251 | 46 |
| 140 | 44 | 252 | 47 |
| 142 | 24 | 253 | 55 |
| 143 | 11 | 254 | 31 |
| 145 | 12 | 255 | 63 |

TABLE IV

Characteristics of Some Optimal Codes for Nulling f/2

| N | M | K | η | n | m |
|---|---|---|---|---|---|
| 4 | 2 | 3 | 50% | 16 | 32 |
| 6 | 4 | 4 | 67% | 64 | 256 |
| 8 | 6 | 4 | 75% | 256 | 1536 |
| 10 | 8 | 5 | 80% | 1024 | 8192 |
| 12 | 10 | 5 | 83% | 4096 | 40960 |

N = number of bits in the word after encoding
M = number of bits in the word before encoding
K = run length; the maximum number of successive zeros in the output
η = coding efficiency = N/M
n = number of words in the lookup table for encoding = $2^N$
m = number of memory bits required for the lookup table for encoding = $n^M$

What is claimed is:

1. In a code signaling system,
   translating means for translating coded data to provide a spectral null at a predetermined frequency including an addressable translating apparatus for providing a coded output signal in response to a coded input signal,
   monitoring means for monitoring the output signals from said translating apparatus with respect to predetermined limit conditions for providing code selection data as a function of said output signals, said monitoring means having an output connected to supply said code selection data to modify the input signal to said translating means whereby said spectral null is achieved at said predetermined frequency.

2. A system in accordance with claim 1 wherein said translating apparatus comprises a memory table, and said monitoring means includes parity and sine-cosine logic.

3. A magnetic recording system in accordance with claim 1 wherein the output of said translating apparatus is coupled to the write driver circuits of a magnetic recording head with a servo head adapted to receive servo control signals at the frequency of said spectral null from a servo track on a magnetic recording medium.

4. A method for translating coded data to provide a spectral null at a predetermined frequency with an addressable translating table for providing a coded output corresponding to a coded signal, comprising
   translating input data with the table,
   monitoring the results from said translating table with respect to predetermined limit conditions for code selection address data as a function of said results, and
   using said code selection address data to modify the address used in the translating table for the next address whereby said spectral null is achieved at said predetermined frequency.

5. A method in accordance with claim 4 wherein said monitoring step includes calculating parity and sine-cosine relationships in the coded output.

6. A method in accordance with claim 4 including passing the coded output to the write driver circuits of a magnetic recording head with a servo head adapted to receive servo control signals at the frequency of the spectral null from a servo track on a magnetic recording medium.

7. Means for translating binary coded data to provide a spectral null at a predetermined frequency including,
a code translator with tables of encoded data,
control inputs for selectively changing the address data supplied to said translator,
a plurality of summing means for maintaining running sums as a function of the output of said translator having an output connected to said control inputs,
whereby the output code from said translator is modified to have a spectral null at said predetermined frequency.

* * * * *